March 23, 1926.  1,577,761
C. H. RUTH
DOUBLE TRACK EXTENSIBLE DREDGER
Filed July 18, 1923   6 Sheets-Sheet 3
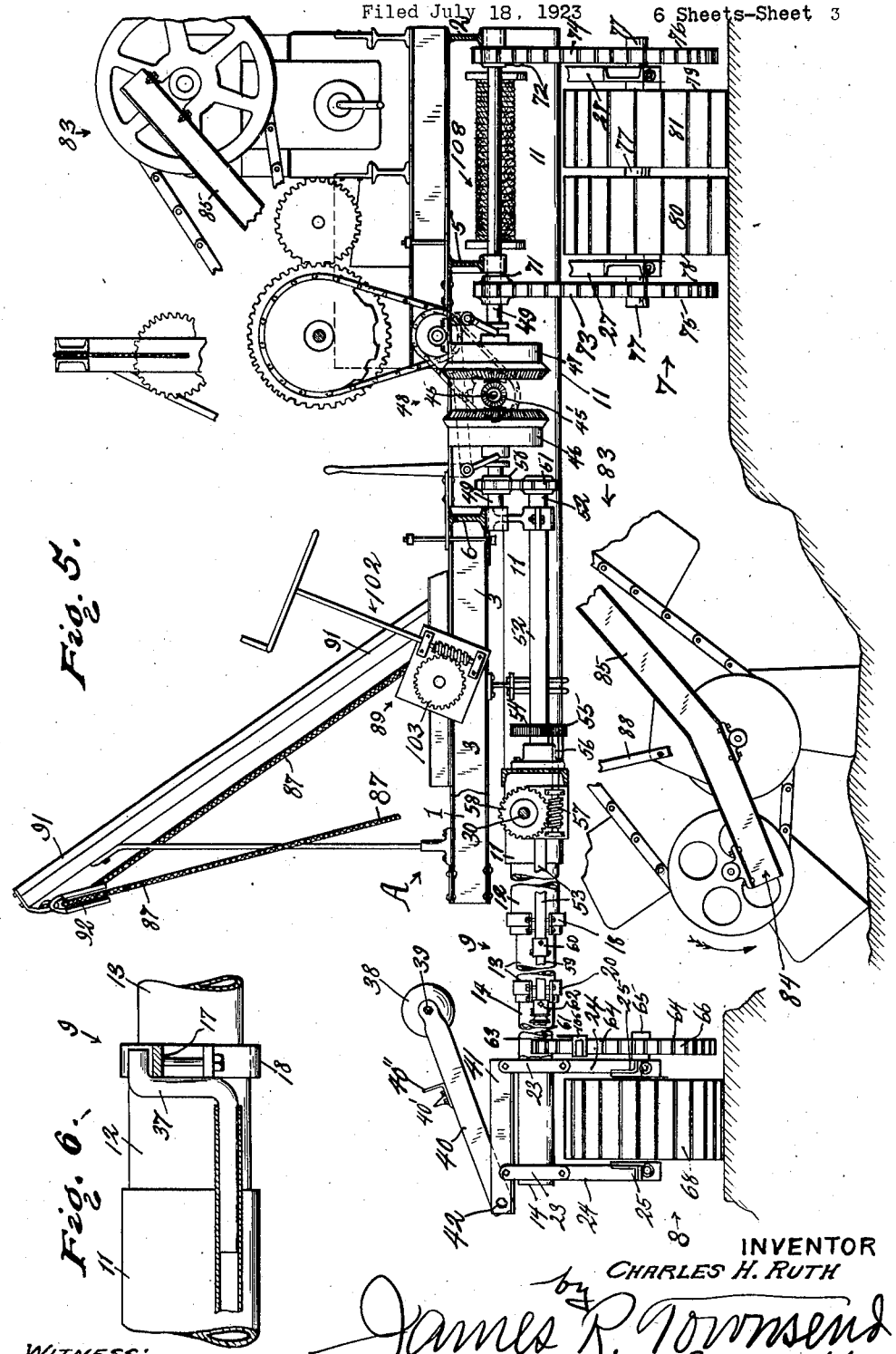
INVENTOR
CHARLES H. RUTH
by James R. Townsend
his atty.
WITNESS:
John A. McDowell March 23, 1926.
C. H. RUTH
1,577,761
DOUBLE TRACK EXTENSIBLE DREDGER
Filed July 18, 1923    6 Sheets-Sheet 4
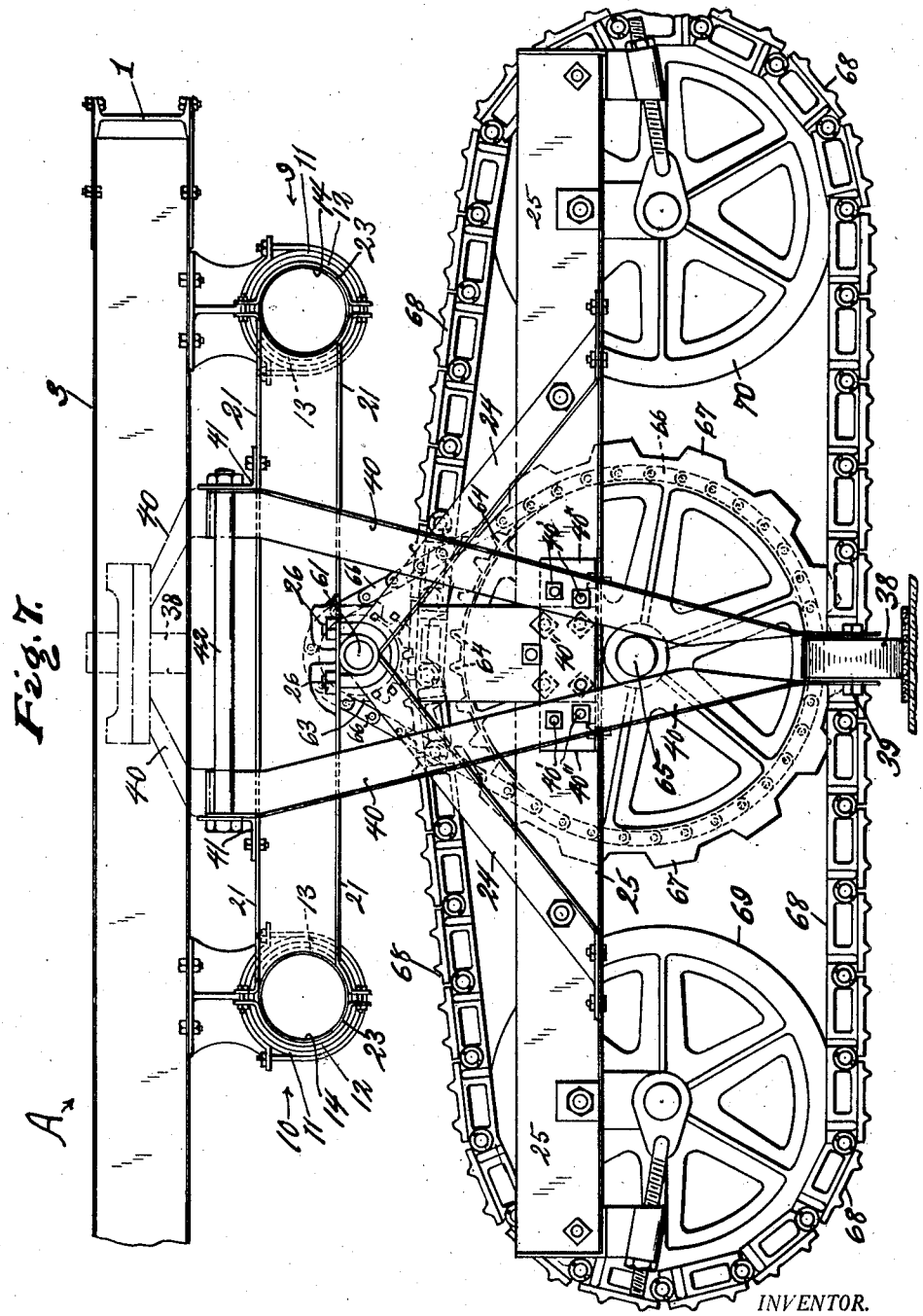
INVENTOR.
CHARLES H. RUTH
BY Townsend
his ATTORNEY

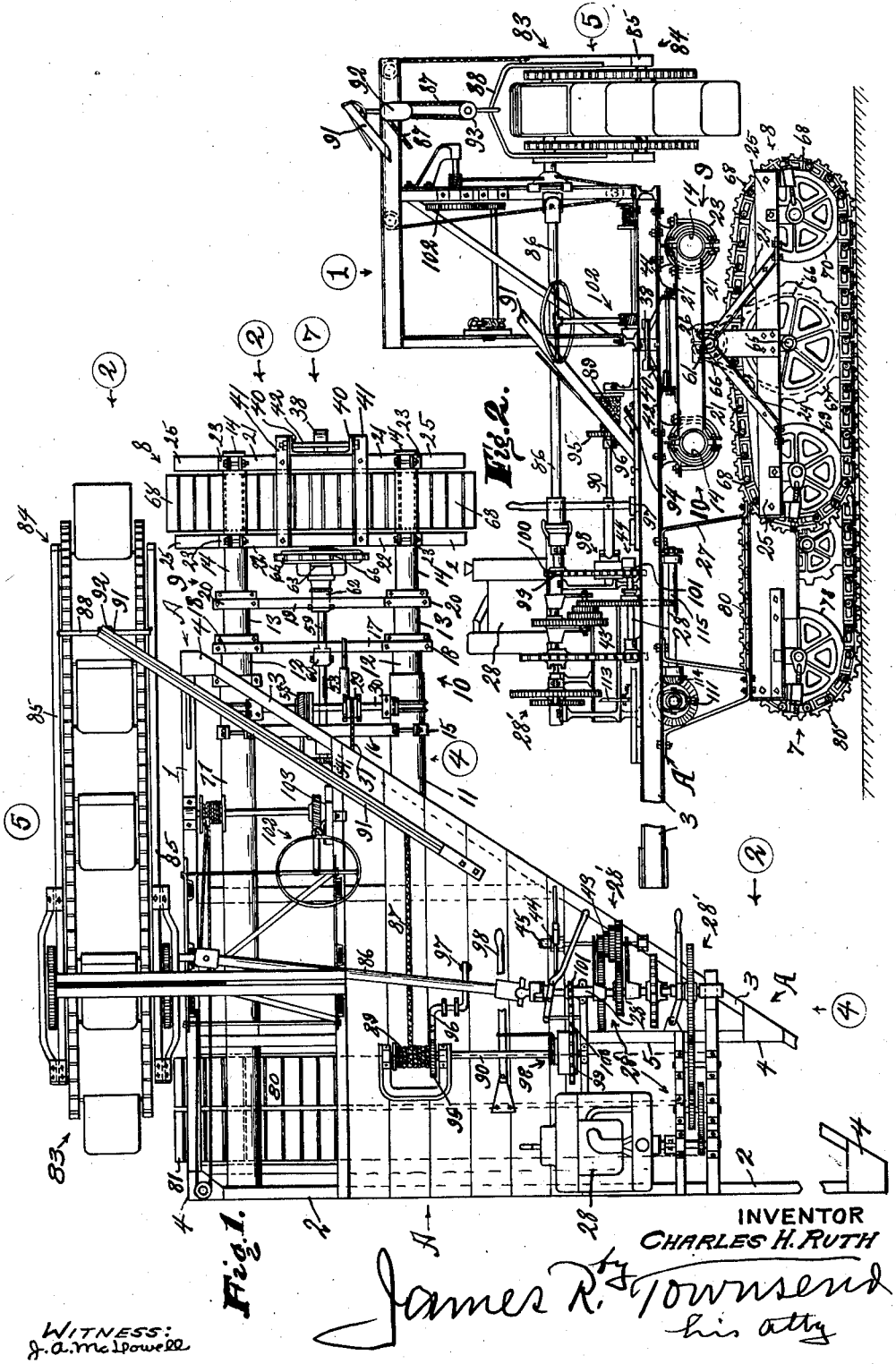

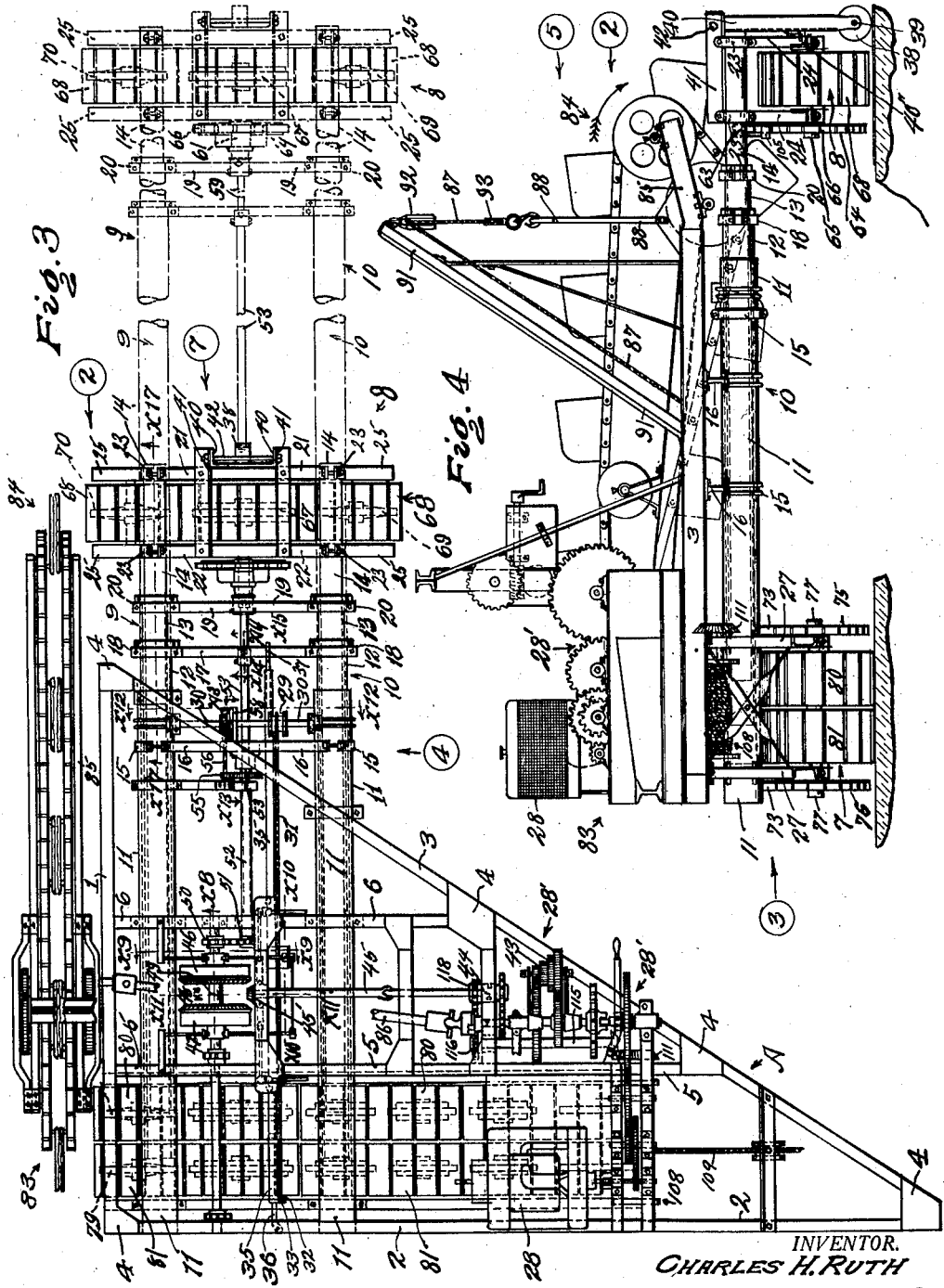

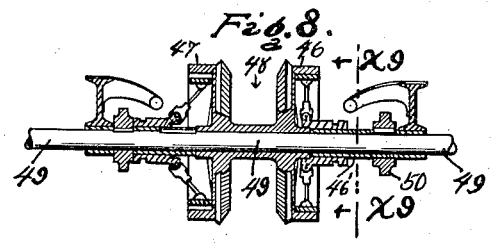
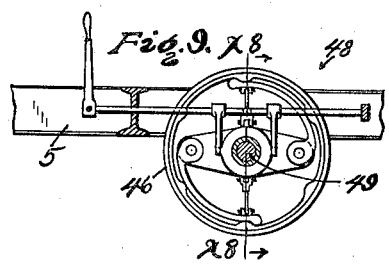
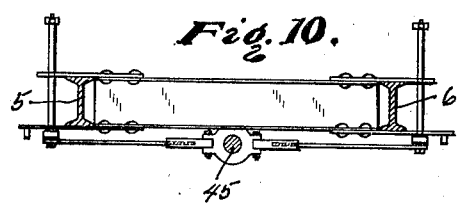
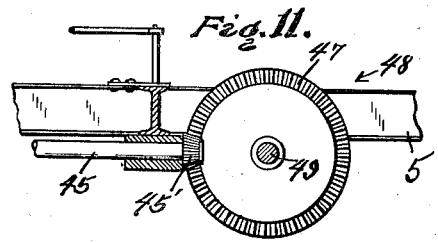
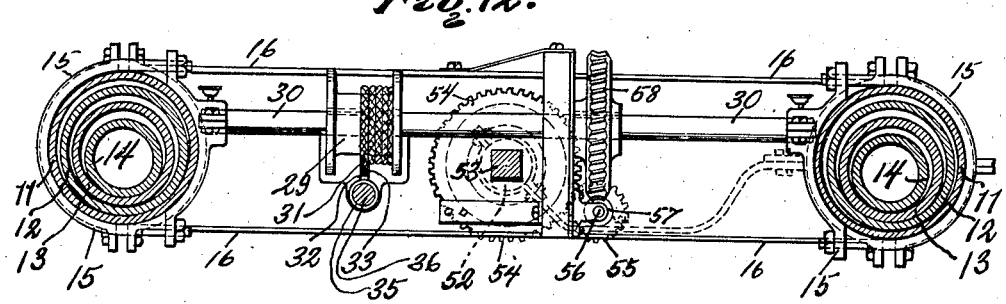
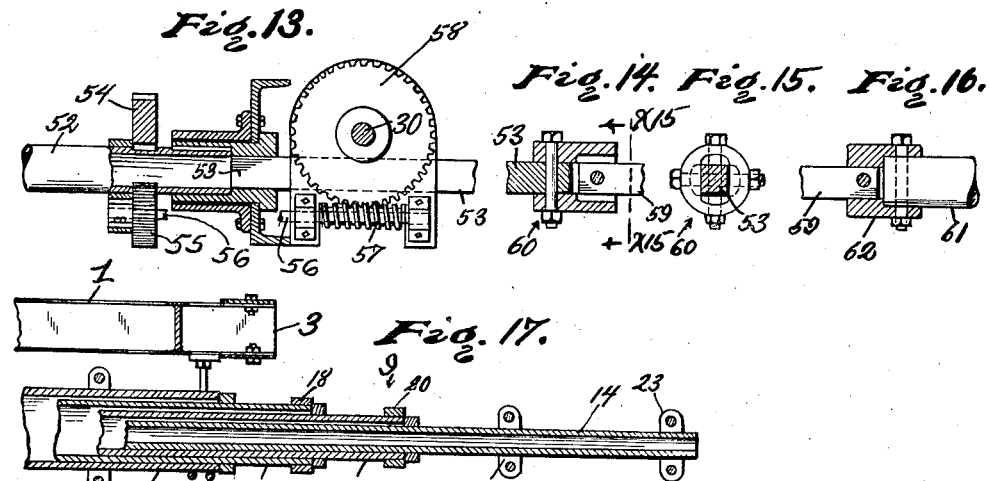

March 23, 1926.
C. H. RUTH
DOUBLE TRACK EXTENSIBLE DREDGER
Filed July 18, 1923  6 Sheets-Sheet 6
1,577,761
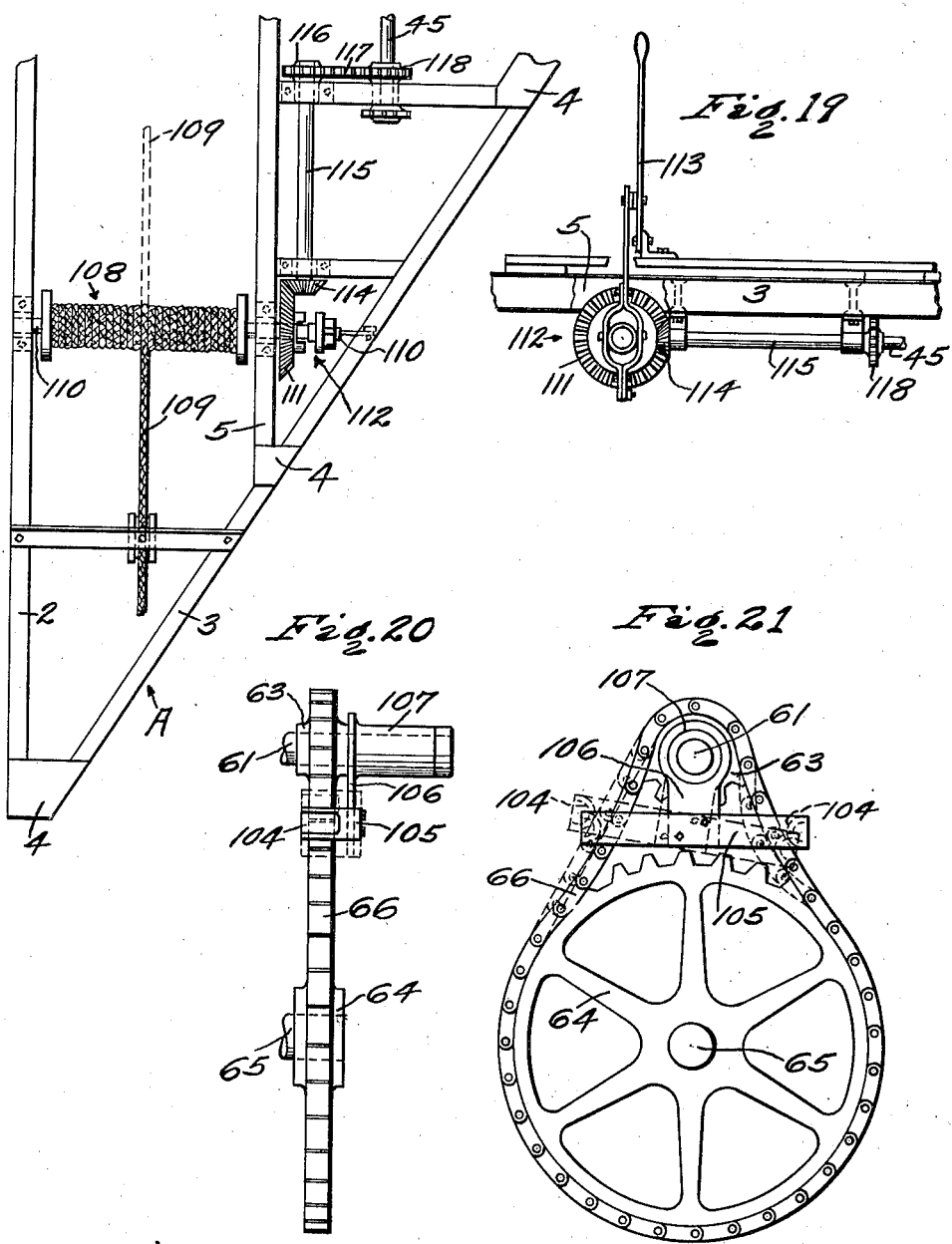
WITNESS:
John A. McDowell
INVENTOR
Charles H. Ruth
by James R. Townsend
his atty.

Patented Mar. 23, 1926.

1,577,761

UNITED STATES PATENT OFFICE.

CHARLES H. RUTH, OF HUNTINGTON PARK, CALIFORNIA.

DOUBLE-TRACK EXTENSIBLE DREDGER.

Application filed July 18, 1923. Serial No. 652,260.

To all whom it may concern:

Be it known that I, CHARLES H. RUTH, a citizen of the United States, residing at Huntington Park, in the county of Los Angeles and State of California, have invented a new and useful Double-Track Extensible Dredger, of which the following is a specification.

This invention relates to apparatus for forming and cleaning canals, irrigating ditches and other channels; and it comprises improvements of the excavating machine set forth in United States Letters Patent No. 1,287,760, granted to me December 17, 1918.

An object of this invention is to improve the means for supporting and transporting the dredger and to that end I provide a main tractor comprising a pair of self laying track tractors of wide tread and length; and arranged side by side and adapted to support and carry a major portion of the dredger frame and excavating apparatus thereon; and adjustably connected to the frame, and parallel with the main tractor is a flank caterpillar tractor of wide tread and length supporting the lighter portion of the frame; and I provide means whereby these tractors may be operated either independently or in timed relation to each other; and said tractors are so constructed that they will travel over very soft yielding ground without sinking to a stalling depth; and they are also constructed so that they can transport the heavy dredge over uneven ground or through territory covered by heavy weeds and underbrush common to ditches and small streams.

In other words the tractors are formed and arranged so that they will crush down the heavy weeds and underbrush growth along ditches that need re-dredging to deepen and clean them of obstructions that retard the flow of water.

It is necessary to frequently redredge irrigating ditches on account of silt deposits, washing down of the banks, refilling in by wind shifted soil and sand and by rank and rapid growth of grass, weeds and underbrush that clog the channels and prevents free flow of water. Irrigating systems, now being established in western portions of the United States are of vast extent and comprise main canals of considerable width, depth and length which supply lesser channels of decreasing width; and from these lesser channels distributing arteries of still less width are formed that discharge into a vast number of still smaller irrigating ditches of various width, depth and length; and gates and checks are interposed between the main canal and channels as well as between all the other water diverting or checking points throughout the system; and numerous low bridges for travel and transportation cross the numerous water ways.

An object of this invention is to provide a dredger that can be easily and speedily adjusted to any of the various widths and depths of the water ways, and which can also pass over the gates, checks and bridges without deviating from its course along a canal or channel. That is to say, an object is to provide a dredger that will work up directly to the gates, checks and bridges and that will pass over them freely, and be ready for immediate operation beyond; and the invention is broadly new, basic and pioneer in the construction and arrangement of the tractors whereby the necessarily heavy dredger can be safely transported and operated over soft, uneven and obstructed ground and whereby it can be quickly and easily adjusted to channels of various widths and depths and in its adaptability of clearly passing over gates, checks and low bridges; and in this respect the dredger includes a main tractor, a flank tractor and dredging mechanism adapted to be carried thereby and operated therebetween.

An object of the invention is to provide an easy and efficient means for adjusting the flank tractor toward or from the main tractor, and to effect such adjustment mainly by engine power. That is, the dredger engine is utilized to force the flank tractor toward or from the main tractor and an idler and manual means may be employed to support the flank tractor; and such idler is adapted to travel transversely to the tractors.

An object of the invention is to provide a dredger that will move forward while digging and which in moving is easily directed in a predetermined course by control of the tractors; and by this control the dredger can be turned to any degree or squarely around for operation in any direction.

A feature of the invention is shown in the construction, control and operation of the dredger appliance; and comprises means for lowering the dredger buckets to a great depth or elevating them to clear gates, checks and bridges.

Another feature of the invention is shown in the novel construction, combination and arrangement of parts comprising the telescoping means interposed between the main and the flank tractors.

A feature of the invention is shown in the pivotal connection of the flank tractor to the frame; by such connection the flank tractor is adapted to adjust itself to uneven surfaces that are out of parallelism with the surfaces over which the main tractor is traveling. That is to say, when the dredger is moving over uneven ground, the flank tractor can adjust itself to move over a declining surface while the main tractor is moving on a surface inclined upwardly and vice versa; and the adaptability to such movement is provided for by pivoting the flank tractor on a drive shaft.

A feature of the invention is shown in the novel means for tightening the drive chain of the flank tractor.

A feature of the invention is shown in the means for operating a cable drum for aiding to transport or stabilize the dredger.

Other objects, advantages and features of invention may appear from the accompanying drawing, the subjoined detail description and the appended claims.

The accompanying drawings illustrate the invention.

In some of the views circle arrows having numerals in the circles, respectively indicate the direction of sight upon such view from which the figure indicated by the numeral was taken.

Figure 1 is a fragmental plan of a dredger constructed in accordance with this invention; parts are omitted to expose features desired to be shown in the view. The excavator is shown raised out of commission and the tread is contracted.

Fig. 2 is an elevation of the dredger viewed from the right of the solid lines in Figs. 1 and 3.

Fig. 3 is a fragmental plan view of the dredger, reduced to its most contracted form. Parts are omitted to avoid confusion and to expose parts that would otherwise be hidden. Dot and dash lines indicate a more extended adjustment of the flank tractor, and fragments of the elevator and its support are shown.

Fig. 4 is a side elevation of the machine contracted as shown in solid lines in Figs 1 and 3, viewed from the circle 4 arrows in Figs. 1 and 3, and spanning a narrow canal, the margins of which are shown.

Fig. 5 is a broken enlarged fragmental elevation of the machine with the flank tractor in extended position showing the excavator in digging position; parts are omitted to avoid confusion and obscuration of parts essential to the view.

Fig. 6 is a fragmental sectional detail of a joint of the draw and push bar for moving the flank tractor toward and from the main tractor.

Fig. 7 is an enlarged fragmental elevation of the flank tractor looking at the right end of Figs. 1 and 3 in the direction of the circle 7 arrow in each of said figures.

Fig. 8 is a fragmental section on line $x^8$, Figs. 3 and 9, showing driving clutches one clutch showing the in, and the other clutch showing the out position.

Fig. 9 is a sectional elevation on line $x^9$, Figs. 3 and 8.

Fig. 10 is a sectional fragmental elevation on line $x^{10}$, Fig. 3.

Fig. 11 is a sectional fragmental elevation on line $x^{11}$, Fig. 3.

Fig. 12 is an enlarged sectional detail on line $x^{12}$, Fig. 3.

Fig. 13 is an enlarged fragmental section on line $x^{13}$, Fig. 3, showing parts associated therewith in section and side elevation.

Fig. 14 is a fragmental section on line $x^{14}$, Fig. 3.

Fig. 15 is a section on line $x^{15}$, Fig. 14.

Fig. 16 is a fragmental sectional detail of the driving joints in the shaft for driving the flank tractor.

Fig. 17 is a fragmental section on line $x^{17}$, Fig. 3.

Fig. 18 is a fragmental plan view of the cable drum.

Fig. 19 is a fragmental side view of the cable drum clutch.

Fig. 20 is a fragmental view of the flank tractor chain tightener.

Fig. 21 is a side view of the flank tractor chain tightener.

The main frame A is heavily weighted and is of a right angle triangle form having the main, or base beam 1, the normal beam 2, and the oblique beam 3 formed of metallic I beams that are suitably connected by plates 4 which are secured thereto preferably by welding or riveting; and parallel to and spaced apart from the normal beam 2 and suitably joined to the base beam 1 and the oblique beam 3, are the intermediate normal beams 5, 6.

The main track laying tractor 7 is arranged underneath the space between the beams 2 and 5 and connected thereto, in parallelism therewith to support the major portion of the frame and the apparatus and appliances connected thereto; and the tractor 7 has tread chains of great length and width so that they will support an enormous weight on soft marshy ground without sinking to a depth that would interfere with its travel, and comprises two tractors substantially alike that are driven in timed relation to one another; and they are also preferably arranged so that they extend rearwardly slightly beyond the base beam 1 and forwardly to the part of the frame that is about the width of the main tractor.

A flank tractor 8 is provided for supporting a minor portion of the weighted frame and is parallel with and similar in construction to and arranged. when so desired, to travel in or out of time with the tractor 7.

The flank tractor 8 is connected to the main frame by means of sets 9, 10 of loose telescoping pipes that are arranged parallel with the base beam 1; the set of pipes 9 being adjacent the base beam 1 and the second set 10 arranged near the middle of the main frame; and each set consists of a series of four pipes 11, 12, 13, 14, there thus being formed pairs of pipes.

The pipes of the pair of pipes 11 are secured to the main frame by means of clamps 15 and beams 16; and slidably mounted in the pair of pipes 11 is the pair of pipes 12 which have their extended ends yoked together by a cross strap 17 that is secured in place by the clamps 18.

The pipes of the pair of pipes 13 are slidably mounted in the pipes 12 and have their extended ends connected by a cross strap 19 that is secured in place by the clamps 20; and slidably mounted in pipes 13 are the pipes 14 that have their extended ends secured to the straps 21, 22 by clamps 23; and strap 22 is connected to the auxiliary frame 24 on the frame 25 of the tractor 8 by a U-bolt 26, see Figs. 2 and 7.

Auxiliary frames 24, 27 are interposed between the tractors 7, 8 and the main frame and pipe connection thereto so as to support the main frame in an elevated position so that the dredger can easily pass over ordinary obstructions such as gates, checks and low bridges.

The purpose of the telescoping pipes is to adjust the tractor 8 toward or from the main tractors to a right position for the main frame to properly span a channel and to allow the elevator to operate therein; and the adjustment is mainly accomplished by engine power; and preferably the exterior diameters of the pipes 12, 13 and 14 are less than the diameter of the pipe into which they extend so that they can easily telescope.

The dredger is provided with an engine 28 that is connected by trains of gears, shafts and clutches 28' with a drum 29 on shaft 30, and to this drum is connected one end of a cable 31 that has its other end 32 attachable to either of the lugs 33, 34 on a shift pipe 35.

When the tractor 8 is to be moved away from the tractor 7, the end 32 of cable 31 is attached to the lug 33; and then power is applied to the drum 29 to wind up the cable which will cause the shift pipe 35 to slide on the rod 36 toward the tractor 8; and the end of pipe 35 adjacent the lug 34 is provided with a draw and push bar 37 that is adapted to hook over either of the cross straps 17, 19 and 22 to move the telescoping pipes connected therewith in the direction the shift pipe 35 is actuated.

To adjust the tractor 8 outward from the main tractor, the bar 37 will first be placed over the strap 22 to force the pair of pipes 14 outwardly a distance of about eight feet; then the bar 37 and associated parts are moved back to engage the cross strap 19 to push out the pipes 13; and then engage the strap 17 to actuate pipes 12 outwardly, thereby forcing the tractor 8 a required distance, say twenty-four feet or more away from a close up position to the main frame; and when the tractor 8 is to be adjusted toward the main tractors, the parts are actuated in a reversed order.

To facilitate the adjustment of tractor 8 toward or away from the main tractor, an idle roller 38 is provided that is manually moved into place after the tractor 8 has been elevated by a lifting jack for that purpose.

Roller 38 is mounted on a bearing 39 that passes through the free end of a yoke 40; and this yoke is pivotally connected to the strap 21 by angle irons 41 and a rod 42, so that when not in use the yoke can be turned back over the tractor 8 into idle position as shown in Fig. 5; and when in use it is turned down into the full line position of Figs. 3, 4 and 7 after the tractor 8 has been elevated for that purpose. It is temporarily secured in position to support the tractor by means of bolts 40' that pass through an angle iron 40'' secured to the frame 25 as best shown in Figs. 4 and 7.

Drum 29 is actuated by the engine 28 through the differential 43 that is provided with a clutch 44 and connected to a driven shaft 45 having a pinion 45' that is adapted to actuate either member 46, 47 of gear clutch 48 on shaft 49. The gear faced member 46 has a sleeve 46' extending along shaft 49 on which there is a sprocket 50 connected by a chain to the sprocket 51 on a sleeve 52; in which there is slidably mounted a squared shaft 53.

On the shaft 52 there is a gear 54 that is adapted to engage a sliding pinion 55 on a shaft 56 that has a worm 57 engaging the wheel worm 58 on the shaft 30 so when engine power is applied to this shaft, gear and clutch connection the drum 29 will be rotated to move the cable 31; and by means of alternately shifting the end 32 of the cable from lug 33 to 34, the pipe 35 can be reciprocated to push out the tractor 8 or to draw it in toward the main tractor; and this drive is disconnected by sliding the pinion 55 out of engagement with the gear 54 which can either be accomplished by hand or by a clutch not shown, either of which means are old and well understood, and for that reason are not shown or described in detail.

It is understood, of course, that while drum 29 is being actuated, the connection of squared shaft 53 with the link connection 59 of the tractor 8 is disconnected and the clutch 48 shifted so that member 46 engages the pinion 45'; in other words, the dredger must be stationary while the adjustment of tractor 8 is accomplished.

The squared shaft 53 is connected to the link connection 59 by a loose coupling 60, as best shown in Figs. 14, 15; and the link has its other end connected to the flank drive shaft 61 of tractor 8 by loose coupling 62 as shown in Fig. 16; and the link connection 59 comprises a number of shafts of various and suitable lengths for making connections between the shafts 53 and 61 when the tractor 8 is moved toward or from the main tractor 7.

Shaft 61 is supported by the frame 24 and has attached thereto a sprocket 63 that has a driving connection with a sprocket 64 on shaft 65 by a chain 66; and the shaft 65 carries a drive tread sprocket 67 that actuates the tread chain 68 that extends over the idlers 69, 70, that are rotatably connected at opposite ends of the frame 25, see Figs. 3, 4 and 5; so that when the shaft 53 is driven in either direction it will correspondingly actuate the tractor 8.

Shaft 49 adjacent the beams 2, 5 is provided with sprockets 71, 72 that are connected by chains 73, 74 with sprockets 75, 76 on the shaft 77 that has arranged thereon the sprockets 78, 79 that drive the tread chains 80, 81 that pass over the idlers 82, see Figs. 1, 2, 14; and the drive of the flank tractor 8 is in time with the drive of the main tractor so that they can be operated together to propel the dredger. However, it is understood that the tractors can be operated independently of one another; that is, one can be kept idle while the other moves, which will cause the dredge to move in the arc of a circle or turn around; and by this means the dredger is guided.

The excavating appliance 83 is similar in construction and operation to the excavating conveyor shown and described in my prior Patent No. 1,287,760, hereinbefore mentioned, except that the heavy end 84 of the appliance 83 is now lowered from idle to working position and vice versa by power, whereas heretofore it was principally manipulated by hand.

The excavator 83 has a frame 85 pivotally mounted on a shaft 86 with a major portion of the excavator extending toward the end 84 that is moved up and down when necessary by a cable 87 that has an end portion connected to a yoke 88 and the other to a drum 89 on a shaft 90.

Cable 87 is supported in position to raise and lower end 84 of the excavator by means of an extension 91 from the main frame; and the upper end of this extension is provided with a pulley block 92 to which one end of the cable 87 is secured and this cable then is extended downward around a pulley 93 secured to yoke 88 and thence upward over a pulley in the block 92 and then downward in an inclined direction and a guide pulley 94 on the main frame, after which it passes to the drum 89.

When the end 84 has been raised or lowered to a desired position it is held in place by a ratchet wheel 95 that is engaged by a dog 96 which is mounted on frame; and dog 96 is provided with a foot pedal 97 by which the ratchet wheel is released when power is to be applied to shaft 90 to move the end 84 of the excavator in either direction.

When shaft 90 is to be rotated the clutch 98 is moved into position to clutch a sprocket wheel 99 that is connected by a chain 100 to a sprocket wheel 101 on the shaft 28' which is actuated by engine 28.

A hand wrench 102 is provided for raising and lowering the shaft 86 and associated parts; also means 103 are provided for shifting the excavator 83 longitudinal of the frame 1 to adjust it to idle or working position.

The chain 66 is held in suitable driving engagement with the wheels 63, 64 by the curved contact 104 at the ends of a cross bar 105 and this cross bar is supported by an arm 106 on a sleeve 107 that is supported by the shaft 61. The cross bar is arranged so that it can move to compensate for the altered positions of the flank tractor; see Figs. 20, 21.

Means additional to the tractors are provided for propelling the dredger, and comprise a drum 108 mounted on the frame and provided with a cable 109, the free end of which can be attached to a dead man, not shown, either in the rear or in advance of the dredger; and the drum is driven by the engine 28 so that as the cable is wound on the drum the dredger is propelled in one direction or the other as the case may be.

The drum 108 is secured to a shaft 110 on which there is loosely mounted an idle bevel gear 111 and this gear carries one member of a clutch 112, the other member of which is feathered to the shaft 110 and moved into and out of engagement with the member of gear 111 by a lever 113, see Figs. 18, 19, The gear 111 meshes with a gear 114 on the shaft 115; and on the other end of shaft 115 is a sprocket 116 connected by a chain 117 to a sprocket 118 on the shaft 45 that is in driving connection with the engine 28; and this connection has heretofore been described.

The operation of the various co-acting parts has been described in the detailed description and for the sake of brevity will not be repeated; except to state that the drum 108 can be employed to propel the dredger either when the tractors are active or inactive.

I claim:

1. A dredger comprising a frame; a main track laying tractor supporting a major part of said frame; a flank track laying tractor for supporting a minor part of said frame; means for adjusting said flank tractor toward or from said main tractor; excavating appliance on said frame; and means for actuating said tractors to transport said frame and operate said excavating appliance.

2. A dredger comprising a main frame; a main tractor; a flank tractor; auxiliary frames interposed between said tractors; and said main frame; means for adjusting said flank tractor toward or from said main tractor; excavating appliance on said main frame; and means for actuating said tractors to transport said main frame and operate said excavating appliance.

3. A dredger comprising a frame; a main track laying tractor supporting a major portion of said frame and comprising two parallel units of the same length and width of tread and arranged side by side; a shaft driving both units; a flank track laying tractor offset from and arranged parallel to the main tractor and adapted to support a minor part of said frame; means for driving said tractors together in timed relation with, or independently of one another; and an excavating appliance operably connected to said frame.

4. A dredger comprising a frame; a main track laying tractor supporting a major part of said frame said tractor comprising two parallel units of the same length and width of tread and arranged side by side and driven by the same shaft; a flank track laying tractor offset from and arranged parallel to the main tractor and adapted to support a minor part of said frame; means for moving said flank tractor toward or from said main tractor; excavating appliance on said frame; and means for actuating said tractors to transport said frame and operate said excavating appliance.

5. A dredger comprising a frame; a main track laying tractor supporting a major part of said frame; a flank track laying tractor supporting a minor part of said frame said tractors arranged parallel to one another; a pipe fixed to said frame; a reciprocating pipe slidably mounted in said fixed pipe said reciprocating pipe connected to said flank tractor; means for moving said reciprocating pipe to move said flank tractor toward or from said main tractor; excavating appliance connected to said frame; and means for actuating said tractors to transport said frame and operate said excavating appliance.

6. A dredger comprising a frame; a main tractor supporting a major part of said frame; a flank tractor supporting a minor part of said frame said tractors arranged parallel to one another; a pipe fixed to said frame; a reciprocating pipe slidably mounted in said fixed pipe said reciprocating pipe connected to said flank tractor; a draw and push bar for engaging said reciprocating pipe; excavating appliance connected to said frame; and an engine for actuating said draw and push bar to adjust said flank tractor toward or from said main tractor said engine adapted to drive said tractors and operate said excavating appliances.

7. A dredger comprising a frame; a main tractor supporting a major part of said frame; a flank tractor supporting a minor part of said frame said tractors arranged to travel in parallel courses; parallel pipes fixed to said frame; reciprocating pipes slidably mounted in said fixed pipes said reciprocating pipes having ends extending outward beyond the ends of the fixed pipes; a strap connecting the extending ends of said reciprocating pipes; a connection between the extended ends of said reciprocating pipes and said flank tractor; means for moving said reciprocating pipes to adjust said flank tractor toward or from said main frame; excavating appliance supported by said frame; and means for actuating said tractors to transport said frame and operate said excavating appliance.

8. A dredger comprising a frame; a main tractor supporting a major part of said frame; a flank tractor supporting a minor part of said frame said tractors arranged to travel in parallel courses; a pair of parallel pipes fixed to said frame; intermediate pairs of pipes telescoping and slidably mounted in said fixed pipes; strap connection between each pair of pipes; another pair of pipes with adjacent ends fixed to said flank tractor; a draw and push bar for successively engaging the connections of the intermediate pairs of pipes and the pipes fixed to the flank tractor; power means for actuating said draw and push bar to move said pipes to adjust said flank tractor toward or from said main tractor when said bar is engaged with the connections of said pipes; an idler for supporting said flank tractor while being adjusted; and excavating appliance on said frame said tractor and appliance adapted to be operated by the same power means that is employed to adjust said flank tractor.

9. A dredger comprising a main tractor; a flank tractor arranged to travel in a course parallel to the course of said main tractor; means for adjusting said flank tractor toward or from said main tractor; a frame supported by said tractors; excavating appliance on said frame; and means for actuating said tractors to transport said frame and to operate said excavating appliance.

10. A dredger comprising a main tractor; a flank tractor arranged to travel in a course parallel to the course of said main tractor; means for adjusting said flank tractor toward or from said main tractor; a main frame; auxiliary frames interposed between said main frame and said tractors for holding said main frame in an elevated position so that it can pass over checks, gates and low bridges of irrigation channels; excavating appliance on said main frame; means for raising or lowering said appliance; and means for actuating said tractors to transport said frames and to operate said appliance.

11. A dredger comprising a main tractor said tractor comprising a pair of track laying units having wide and extended tread chains; a flank tractor comprising a single track laying unit having a wide and extended tread chain, said tractors arranged to travel in parallel courses; a frame supported by said tractors; excavating appliance on said frame; and means for actuating said tractors to transport said frame and operate said appliance.

12. A dredger comprising a main tractor said tractor comprising a pair of track laying units having wide and extended tread chains; a flank tractor comprising a single track laying unit having a wide and extended tread chain; said tractors arranged to travel at the same speed; means for adjusting said flank tractor toward or from said main tractor; a frame supported by said tractors; excavating appliance carried by said frame; and means for actuating said tractors to transport said frame and to operate said appliance.

13. A dredger comprising a main tractor; a flank tractor; a main frame; auxiliary frames interposed between said tractors and said main frame for holding said main frame in an elevated position so that the dredger can pass over checks, gates and bridges of an irrigating channel without changing its course of travel; excavating appliance pivotally mounted on said frame; and power means for moving said excavator on its pivot said power means adapted to actuate said tractor and excavating appliance.

14. A dredger comprising a main tractor; a flank tractor; a main frame; auxiliary frames interposed between said tractors and said main frame for holding said main frame in an elevated position so that the dredger can pass over checks, gates, and bridges of an irrigating channel without changing its course of travel; excavating appliance pivotally mounted on said frame; means for shifting the pivot of said excavating appliance; and power means for moving said excavator on its pivot said power means adapted to actuate said tractor and excavating appliance.

15. A dredger comprising a main tractor; a flank tractor; a main frame; auxiliary frames interposed between said tractors and said main frame for holding said main frame in an elevated position so that the dredger can pass over checks, gates and bridges of an irrigating channel without changing its course of travel; excavating appliance pivotally mounted on said frame; a hand wrench for shifting said appliance across the rear end of said frame; a hand wrench for raising and lowering the excavating appliance; means for raising and lowering the pivot of said appliance; and power means for moving said appliance on its pivot; said power means adapted to actuate said tractor and operate said appliance.

16. A dredger comprising a main tractor; a frame supported by said tractor; an engine on said frame; a flank shaft having a driving connection to said engine; a flank tractor pivotally mounted on and driven by said shaft; dredging appliance carried by said frame; and an operative connection between said engine and appliance.

17. A dredger comprising a main tractor; a main frame supported by said tractor; an engine on said main frame for driving said tractor; a flank shaft having a driving connection to said engine; a flank tractor having a frame pivotally connected to said flank shaft; a driving connection between said shaft and flank tractor; dredging appliance carried by said main frame; and an operating connection between said engine and appliance.

18. A dredger comprising a main tractor, said tractor comprising a pair of parallel track laying units; a main frame on said tractor; an engine on said frame; a driving connection between said tractor and engine; a flank shaft having a driving connection to said engine; a flank tractor; a frame on said flank tractor that is pivotally connected to said flank shaft; a chain drive from said flank shaft to said flank tractor; dredging appliance carried by said main frame; and an operating connection between said engine and appliance.

19. A dredger comprising a main tractor, said tractor comprising a pair of parallel track laying units; a main frame on said tractor; an engine on said frame; a driving connection between said tractor and engine; a flank shaft having a driving connection to said engine; a flank tractor; a frame on said flank tractor that is pivotally connected to said shaft; a chain drive from said flank shaft to said flank tractor; means for adjusting said flank tractor toward or away from said main tractor; dredging appliance carried by said main frame; and an operating connection between said engine and appliance.

20. A dredger comprising a main tractor, said tractor comprising a pair of parallel track laying units arranged side by side; a main frame on said tractor; an engine on said frame; a driving connection between said engine and tractor; a flank shaft having a driving connection to said engine; a flank tractor, said tractor comprising a single track laying unit offset from and arranged parallel to said main tractor; a frame on said flank tractor that is pivotally connected to said flank shaft; a chain drive from said flank shaft to said flank shaft tractor; means for adjusting said flank tractor toward or from said main tractor; excavating appliance carried by said main frame; and an operating connection between said engine and appliance.

21. A dredger comprising a main tractor, said tractor comprising a pair of parallel track laying units arranged side by side; a main frame on said tractor; an engine on said frame; a driving connection between said engine and tractor; a flank shaft having a driving connection to said engine; a flank tractor, said tractor comprising a single track laying unit offset from and arranged parallel to said main tractor; a frame on said flank tractor that is pivotally connected to said flank shaft; a chain drive from said flank shaft and said flank tractor; means for adjusting said flank tractor toward or from said main tractor said means comprising a roller that is normally idle that is movable into position to support said flank tractor and arranged to move transversely to said tractors; excavating appliance carried by said main frame; and an operating connection between said engine and appliance.

22. The dredger set forth comprising a main track laying tractor; a flank track laying tractor; pipes interposed between and connecting said tractor; and a dredging appliance carried by said tractors.

23. The dredger set forth comprising a frame; a main tractor supporting a major part of said frame; a large pipe secured to said frame; smaller pipes loosely telescoping into said large pipe; a flank tractor connected to the extended end of the smallest of said smaller pipes, said pipes arranged so that said flank tractor supports a minor part of said frame and so it can be adjusted toward or away from said main tractor; and a dredging appliance mounted on said frame that is carried by said tractors.

24. The dredger set forth comprising a frame; an engine on said frame; a main tractor supporting a major part of said frame; a large pipe secured to said frame; smaller pipes loosely telescoping into said large pipe; a flank tractor loosely connected to an extended end of the smallest of said smaller pipes, said pipes arranged so that said flank tractor supports a minor part of said frame and so it can be adjusted toward or from said main tractor; a dredging appliance carried by said frame; a driving connection between said engine and tractors; and a driving connection between said engine and dredging appliance.

25. The dredger set forth comprising a frame; a main tractor supporting a major part of said frame; a pair of large pipes secured to said frame; pairs of smaller pipes loosely telescoping into said pair of larger pipes; a flank tractor connected to the extended ends of the smallest of said pairs of pipes, said pairs of pipes arranged so that said flank tractor supports a minor part of said frame and so it can be adjusted toward or away from said main tractor; and a dredging appliance mounted on said frame that is carried by said tractors.

26. The dredger set forth comprising a frame; an engine on said frame; a main tractor supporting a major part of said frame; a pair of large pipes secured to said frame; pairs of smaller pipes loosely telescoping into said pair of larger pipes; a flank tractor secured to the extended ends of the smallest of said pairs of pipes, said pipes arranged so that said flank tractor can be adjusted toward or from said main tractor; means connected with said engine for adjusting said flank tractor; and a dredging appliance on said frame that is carried by said tractors.

27. The dredger set forth comprising a frame; an engine on said frame; a main track laying tractor supporting a major part of said frame; a pair of large pipes secured to said frame; pairs of smaller pipes loosely telescoping into said pair of larger pipes; a flank caterpillar tractor secured to the extended ends of the smallest of said pairs of pipes, said pipes arranged so that said flank tractor can be adjusted toward or from said main tractor; means connected with said engine for adjusting said flank tractor; an idler for elevating and supporting said flank tractor while it is being adjusted toward or from said main tractor; a dredging appliance on said frame that is carried by said tractors; and driving connections between said engine and tractors and between said engine and dredging appliance.

28. The dredger set forth comprising a frame; an engine on said frame; tractors supporting said frame; a dredging appliance on said frame that is actuated by said engine; a drum secured to said frame; a cable having one end secured to said drum and adapted to have its other end detachably connected to a stationary object such as an anchorage or dead man so that when said drum is actuated to wind up said cable said frame will be moved toward the stationary object; a driving connection between said engine and drum; and a clutch interposed in said driving connection.

In testimony whereof, I have hereunto set my hand at Los Angeles, California, this 11th day of July, 1923.

CHARLES H. RUTH.